Jan. 19, 1937. F. G. SCHWALBE 2,068,515
GLASS TANK FEEDING SHELF
Filed April 15, 1935 3 Sheets-Sheet 3
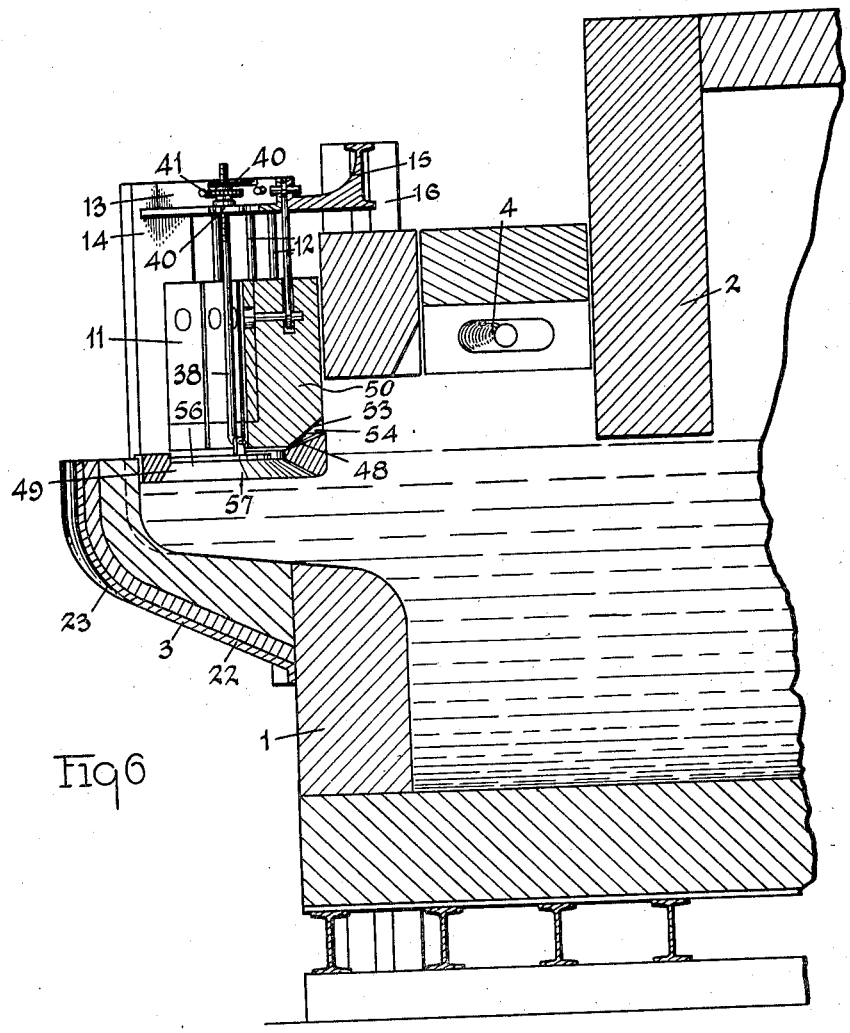
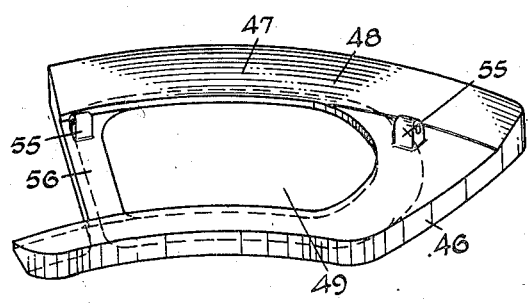
Inventor
Franz G. Schwalbe
By Faust F. Crampton
Attorney Patented Jan. 19, 1937

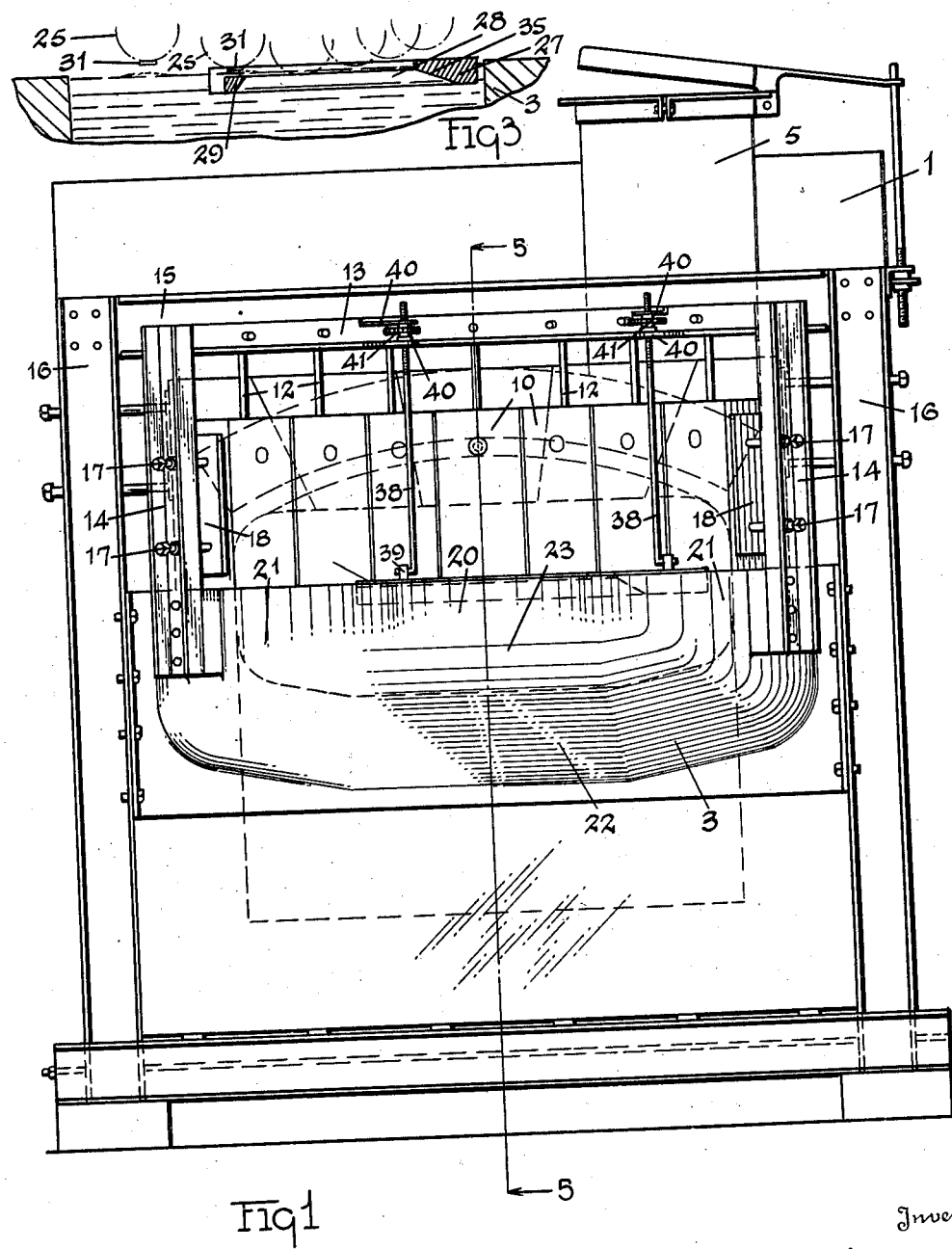

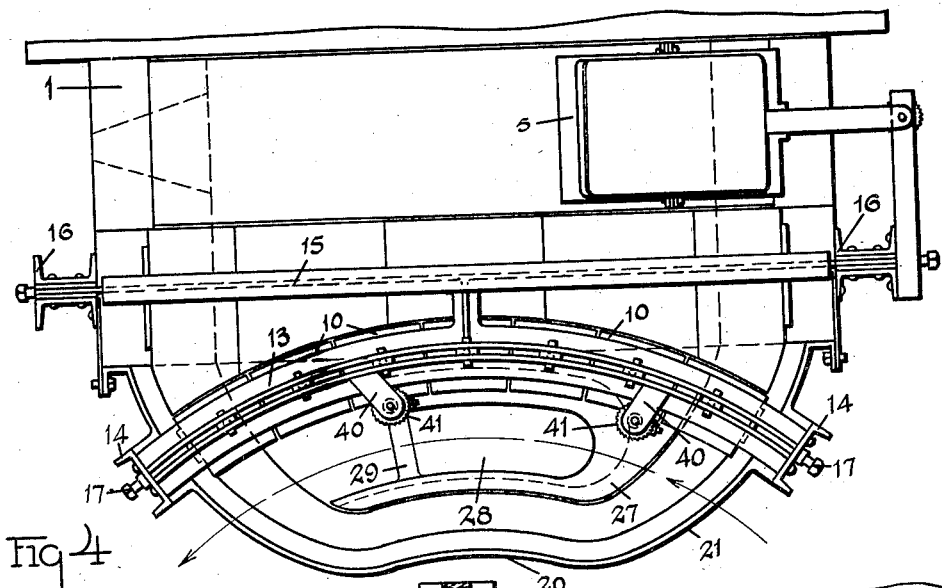
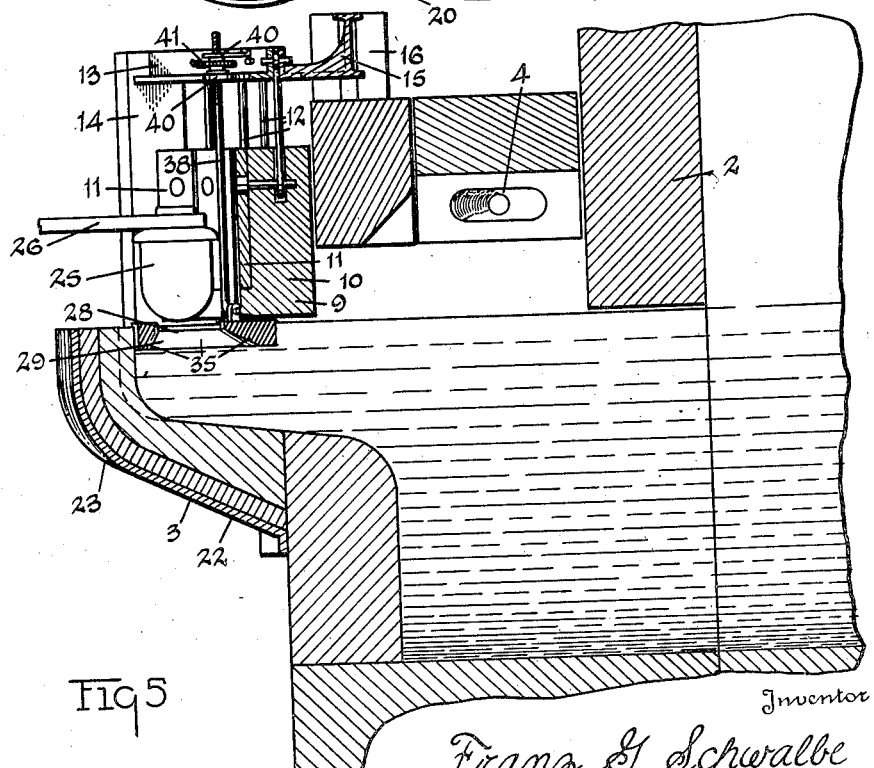

2,068,515

UNITED STATES PATENT OFFICE 2,068,515

GLASS TANK FEEDING SHELF

Franz G. Schwalbe, Toledo, Ohio, assignor to Toledo Engineering Company, Incorporated, Toledo, Ohio, a corporation of Ohio Application April 15, 1935, Serial No. 16,271

7 Claims. (Cl. 49—56)

My invention has for its object to provide a glass tank feeding shelf wherein the temperature of the glass in the shelf is maintained at a substantially constant high temperature to maintain uniform viscosity whereby the glass that is drawn into gathering molds will produce a uniform appearance when shaped into glass articles. The invention eliminates in a large measure the stresses and strains due to the production of glass articles from glass having relatively different viscosities and thus eliminates the formation of stress lines that refractively appear in glass articles formed from glass portions having slight variations in temperature.

The invention also provides a fuel burner or heater located within the furnace in proximity to the shelf for producing a flame of burning gas at a pressure slightly above atmospheric and means for producing a "sting-out" of flame that projects outwardly toward the colder exposed glass in the shelf by reason of the pressure of the burning gas in the furnace.

The invention also provides a plate formed of refractory material floatable on the surface of the glass to cover a major portion of the glass in the glass shelf except for a central glass gathering opening or port and which may be adjustably positioned to vary the "sting-out" from the furnace.

The invention also provides means for directing the heat from the furnace, or the "sting-out", diagonally downward towards the surface of the glass in the glass gathering opening formed in the cover member.

The invention consists in other features which will appear from the following description and upon examination of the drawings. Structures containing the invention may partake of different forms and may be varied in their details and still embody the invention. To illustrate a practical application of the invention, I have selected a glass feeding shelf as an example of the various structures and the details of such structures that contain the invention and shall described the selected structure hereinafter. The particular structure selected is shown in the accompanying drawings.

Fig. 1 illustrates a front view of the shelf. Fig. 2 is a perspective view of the cover part of the shelf. Fig. 3 illustrates diagrammatically the movement of a glass gathering mold relative to the glass as it dips beneath the surface and leaves the surface of the glass. Fig. 4 is a top view of the shelf, and Fig. 5 is a view of a section taken on the plane of the line 5—5 indicated in Fig. 1. Fig. 6 is a view of a section of modified forms of the glass shelf and cover part. Fig. 7 illustrates a perspective view of the cover part shown in Fig. 6.

The furnace 1 may be provided with the usual depending wall 2 that overhangs the surface of the glass in the furnace and a shelf part 3 that protrudes from the body of the furnace. The furnace is provided with a burner 4 that is located in position to heat the glass of the furnace in the vicinity of the glass of the shelf as well as a part of the glass in the shelf and thus maintain the glass in the neighborhood of the shelf at a high temperature. The flame of the burner 4 is produced by a fuel gas and air mixture under pressure and consequently produces a flame that covers considerable area and creates a pressure of burning gas within the furnace slightly above atmospheric pressure, as is commonly the case in burners used in furnaces. If desired, a stack pipe or flue 5, having a suitable damper, may be provided for exhausting the products of combustion produced by the burner 4. The furnace itself is of the form commonly used for melting glass.

The furnace has a wall 9 that overhangs the surface of the glass in the shelf. The wall 9 is formed of a plurality of refractory blocks 10 faced with heat insulating refractory plates 11. The blocks are supported by rods 12 connected to a curved double beam 13 carried on the ends of the uprights 14 which are supported on the ends of the shelf. The double beam 13 is also stayed by the beam 15 which is connected to the buck stays 16 of the furnace. The blocks 10 are pressed towards each other by the bolts 17 that are threaded into the uprights 14 and press against the pressure plates 18. The bolts 17 may be adjusted to allow for the lateral expansion and contraction of the blocks 10 as the furnace is heated up or allowed to chill at the end of a run.

The blocks 10 extend to near the surface of the glass and form a substantially vertical cylindrical wall having a concave exterior surface extending from one end of the shelf 3 to the other end and conforming to the path of movement of the gathering molds as they are rotated and enter beneath and sweep along the surface of the glass in the shelf to gather the glass.

The wall 9 is thus disposed with reference to the path of movement of the molds as to afford the necessary clearance to permit efficient operation of the glass gathering or forming machine and reduce the exposed area of the glass. The heat insulating plates 11 form a heat conserving means.

The front central side part 20 of the shelf 3 is also concavedly curved, and the ends 21 of the side parts of the shelf are convexedly curved to the side wall of the furnace, while the bottom 22 of the shelf slopes to the side wall of the furnace whereby a glass forming machine may be conveniently located in close proximity to the furnace and the gathering molds may enter the glass in the shelf. The glass shelf is so formed as to permit the location of the base of the gathering machine below the path of movement of the gathering molds and thus afford stability and rigidity of the machine as a whole and also prevent deviation from the path of movement of the molds. Preferably the shelf is formed of sheet metal plate 23 lined with suitable refractory blocks for withstanding the glass temperature.

The molds 25 are supported and carried by the arms 26 that are actuated by a glass forming machine of any form well known in the art to sweep the length of the glass shelf in succession and dip into the shelf and withdraw therefrom and draw the glass by suction into the molds.

The glass in the shelf and in the furnace is slightly below the level of the edge or lip of the shelf and consequently the glass in the shelf is shallow relative to the depth of the glass in the furnace and, therefore, has less body and by radiation loses considerable heat.

By my invention the radiation of the glass in the shelf is materially reduced by the cover member, and means is provided for directing the heat or "sting-out" from the furnace over the surface of the chilled glass and regulating the extent of the "sting-out" or amount of heat directed to the surface of the glass in the opening of the cover member.

A floatable refractory cover member 27 is located in the shelf and is floatably supported on the glass. The outer edge of the floatable member conforms to the central front side part 20 of the shelf and one end of the front side part, as indicated in Fig. 4. The member 27 is made of a refractory, glass floatable material and has a central opening 28 extending from near one end to the other end. The opening 28 conforms to the path of the molds and has a width but slightly greater than the diameter of the molds. Where the molds differ in diameter to form articles of different sizes or gather different amounts of glass, cover members having openings corresponding to the diameters of the molds may be used in the different runs. Thus, the cover member affords means for ready adaptation of the furnace to the molds of different sizes that may be used at different times in the glass gathering machine to produce the minimum of exposure to the temperature of the atmosphere.

The cover member 27 is provided with a bridge 29 so located with reference to the sides of the cover member as to be slightly and completely submerged below the surface of the glass when the member is placed upon the glass. The bridge 29 operates to prevent return movement of the glass severed from the molds 25 by the operation of the knife 31. The knife 31 is operated in the manner well known in the art to sever the glass that clings by reason of its viscosity to the molds as the molds are raised from the glass in the shelf. The gobs of glass that are thus severed drop back into the glass of the shelf as the molds rise from the surface of the glass and move over the bridge 29. The chilled gobs of glass that are brought into contact with the surface of the mold and are raised above the surface of the glass in the shelf are thus subject to a greater exposure to the atmospheric temperature, are carried over the bridge, and dropped into the glass furnace on the outside of the bridge with respect to the opening 28 in the cover member substantially as shown in Fig. 3.

The cover member is open at one end except for the bridge, and the bridge is submerged to permit free movement of the surface glass from within the opening 28 caused by the sweeping movement of the molds and circuitously move the surface glass within the opening outwardly through the end of the cover member. The glass moves beneath and above the bridge and at the same time draws the hot glass from the furnace into the opening 28 and thus into a position from whence hot glass may be gathered by the molds. The glass that is thus conveyed from within the opening is directed to an end part of the shelf where there is a continuous "sting-out" from the furnace and is also directed under the wall 9 of the furnace to the hotter region of the furnace produced by the burner 4. There is thus afforded a relative large area for the free movement of the colder glass under the wall 9 into the furnace.

The floatable cover member 27 is relatively thin and has an inwardly and upwardly inclined lateral surface 35 that extends along its sides and its closed end and enables greater heat conduction from the body of the glass in the shelf and furnace toward the surface glass in the opening and prevents the formation of a pocket of material depth where the glass would otherwise stagnate or chill. The surface 35 affords ready movement of the hot glass from the glass of the furnace to the surface of the glass within the area of the opening 28 of the cover member as the molds draw glass by suction from the shelf and as they sweep the surface glass from the opening. The inclined surface 35 of the member 27 also extends along the bridge to enable a free movement of the glass towards the hotter regions at the end of the shelf and into the furnace.

The inner edge of the cover member in the form of construction shown is located below the bottom surface of the cylindrical wall 9. Preferably the greater portion of the inner side of the cover member is thus located below the bottom surface of the cylindrical wall. Rods 38 are connected by means of ears 39 to the inner side part of the cover member 27. The rods extend through double brackets 40 formed or supported on the curved beam 13. The upper ends of the rods are threaded, and adjustable nuts 41 are located between the parts of the double brackets to adjust the height of the inner side of the cover member with respect to the lower end of the wall 9 by depressing the inner side of the covered member or lifting the inner side with respect to the glass and thus causing the member to tilt with respect to the surface of the glass. The adjustment that is thus afforded by the operation of the nuts 41 to either depress or raise the inner side of the cover member 27 controls the "sting-out" which is directed beneath the wall and above the inner side of the cover member. The "sting-out" is directed over the surface of the glass within the area of the opening of the cover member and its temperature is raised or maintained at the desired high temperature notwithstanding the radiation. There is also a "sting-out" produced over the surface of the chilled glass in the end of the shelf from whence the glass moves under the wall into the furnace and coacts to raise its temperature.

The floatability of the cover member with respect to the glass enables the member to maintain a definite relation with respect to the glass and insure coverage of the surface of the glass. It also affords a means of indicating the adjustment that is desirable to be made in the article forming machines to insure immersion of the molds to substantially a constant depth during the gathering operation as the glass is used.

In the form of construction illustrated in Figs. 6 and 7, the cover member 46 has a relatively wide inner side part 47, and the edge of the opening 49 is located well back of the lower forward edge of the cylindrical wall 9. The inner edge of the cover member is located substantially at and along the major part of the inner lower edge of the cylindrical wall 9. The inner side part 47 of the cover member 28 has a sloping surface 48 that extends diagonally downward and inward with respect to the opening of the member. The inclined surface 48 extends from one end of the cover member 46 to the other end of the cover member and forms substantially the entire top surface of the inner side part of the cover member 46. The blocks 50 that form the wall 9 are also each provided with a sloping surface 53 that extends from the inner sides of the blocks to the lower ends of the blocks and slope downwardly and outwardly with respect to the interior of the furnace. The width of the cover member 46 is such as to dispose the surfaces 48 and 53 in substantially opposed positions although the surfaces are inclined slightly with respect to each other so as to slope towards each other from their inner edges to their outer edges with respect to the furnace substantially as shown in Fig. 6 and thereby form a long port or slit having surfaces that slope towards each other and towards the exit of the port. The two surfaces being inclined diagonally downwardly, they direct the "sting-out" from the flame diagonally downwardly towards the surface of the glass in the opening 49 of the cover member 46.

The cover member 46 is also provided with the ears 55 located, one on the bridge formed at one end of the cover member, and the other on the end part of the cover member substantially as shown in Fig. 7. The rods 38 may be connected to the ears 55. The extent of the opening of the port formed between the surfaces is varied, and the "sting-out" and temperature of the surface glass within the area of the opening 49 of the member 46 are controlled by depressing or raising the inner side of the member by means of the rods 38 that are adjusted by the nuts 40 as in the form of construction shown in Figs. 1, 4, and 5.

The cover member 46 is also provided with the sloping lateral surface 57 similar to the lateral surface 35 of the member 27. Also, the member 46 operates in a similar manner to the cover member 27 in preventing exposure of more than a required amount of the surface of the glass in the shelf to the atmosphere, and the bridge 56 which is constructed substantially the same as the bridge 29 also operates to form a means for preventing any backward movement of the colder glass located in the end of the shelf from whence the molds are withdrawn and into which the gobs drop as they are severed by the knife 31 and yet permits substantially free movement of the surface glass from the opening 49. The "sting-out", however, in the form of construction illustrated in Figs. 6 and 7, is diagonally directed downwardly into the surface of the glass within the opening 49 of the cover member 46 by reason of the inclined position of the axis of the port 54, to maintain the glass within the area of the opening 49 hot. The port is normally closed by the floatation of the cover member on the glass which is located in contact with the overhanging wall. The size of the port is regulated by tilting the inner side edge of the cover member 46 by the operation of the rods 48. The inclined surface 48 of the member 46 and the surface 53 of the bottom side of the wall 9 extend the length of the inner side of the cover member 46 leaving, however, a "sting-out" opening in the end of the shelf to which the colder glass is swept by the movement of the molds 30 as they enter the glass shelf in succession to gather glass.

I claim:

1. In combination with a glass shelf, a refractory member substantially fitting the major portion of the interior of the shelf and floatable on the surface of the glass in the shelf and having an oblong glass delivering port, the furnace having a wall overhanging the surface of the glass in the shelf and the inner side part of the member, means for heating the glass within the furnace by a flame produced by fuel under pressure, and means for varying the position of the inner part of the member with respect to the wall to vary the "sting-out" from the furnace and over the glass of the port.

2. In combination with a glass shelf, an oblong curved refractory member substantially fitting the major portion of the interior of the shelf and floatable on the surface of the glass in the shelf and having a curved oblong glass delivering port, the furnace having a wall overhanging the surface of the glass in the shelf and the inner side part of the member, means for heating the glass within the furnace by a flame, produced by fuel under pressure, and means for tilting the member to vary the position of the inner side part of the member with respect to the wall to vary the "sting-out" from the furnace and over the port.

3. In combination with a glass gathering shelf for delivering glass from a furnace to glass gathering molds, the central part of the wall of the glass gathering shelf convexedly curved, the furnace having a curved wall part coaxial with the edge part of the glass shelf and overhanging the glass of the shelf, a refractory member substantially fitting the major portion of the interior of the shelf and floatable on the surface of the glass in the shelf and having an oblong glass delivering opening, means for heating the glass within the furnace by a flame produced by fuel under pressure, the said wall of the furnace normally in contact with the inner side part of the floatable member, means for depressing the said inner side part of the member with respect to the wall to vary the "sting-out" from the furnace and over the opening.

4. In combination with a glass gathering shelf for glass furnaces, a refractory member substantially fitting the major portion of the shelf and floatable on the surface of the glass in the shelf and having an oblong glass delivering opening, a wall overhanging the glass surface and the inner side of the said member, the lower end of the wall having a surface inclined downwardly and outwardly with reference to the interior of the furnace, the member having an inclined surface located in opposed relation to the inclined surface of the wall and inclined relative thereto and also downwardly and inwardly with respect to the opening and forming a port for diagonally directing the heat of the interior of the furnace towards the surface of the glass in the opening.

5. In combination with a glass gathering shelf for glass furnaces, a refractory member substantially fitting the central part and one end of the glass shelf and floatable on the surface of the glass in the shelf and having an oblong glass delivering port extending from near one end of the member to the other end part of the shelf, the furnace having a depending curved wall overhanging the surface of the glass and the inner side part of the said member, and having its lower end located in proximity to the glass surface, means for heating the glass within the furnace by a flame produced by fuel under pressure and operative to produce a "sting-out" between the glass surface of the end portion of the wall located at the uncovered end of the shelf, means for adjusting the said inner side part of the member and tilting the member to vary the extent of the opening between the said inner side part and the lower edge of the wall to vary the "sting-out" over the glass of the said port.

6. In combination with a glass gathering shelf for glass furnaces, a refractory member substantially fitting the major portion of the glass shelf and floatable on the surface of the glass in the shelf and having an oblong glass delivering opening, the furnace heated by a flame of fuel under pressure and having a wall overhanging the glass surface and the inner side part of the refractory member, the lower end of the wall having a downwardly and outwardly inclined surface with respect to the interior of the furnace, and the inner side part of the refractory member having an inclined surface located in opposed relation to the inclined surface of the wall and inclined with respect to the inclined surface of the wall to form a port extending the length of the inside part of the said member, and means for adjusting the inside part of the member with reference to the lower end of the wall to vary the "sting-out" from the furnace over the surface of the glass in the port.

7. In combination with a glass shelf, a refractory member substantially fitting the major portion of the interior of the shelf and floatable on the surface of the glass in the shelf and having an oblong glass delivering port, and a bridge extending across one end of the port and normally submerged below the surface of the glass when the member is located on the glass, the furnace having a wall overhanging the surface of the glass in the shelf of the inner part of the member, means for heating the glass within the furnace by a flame produced by fuel under pressure, and means for varying the position of the inner side part of the member with respect to the wall to vary the "sting-out" from the furnace.

FRANZ G. SCHWALBE.